July 23, 1963 H. J. STEINBACH 3,098,556
CONVEYOR
Filed May 13, 1960 3 Sheets-Sheet 1

INVENTOR
HERMANN J. STEINBACH

BY Walter V. Wright
AGENT

July 23, 1963  H. J. STEINBACH  3,098,556
CONVEYOR
Filed May 13, 1960  3 Sheets-Sheet 2

INVENTOR
HERMANN J. STEINBACH

BY Walter V. Wright
AGENT

July 23, 1963 H. J. STEINBACH 3,098,556
CONVEYOR
Filed May 13, 1960 3 Sheets-Sheet 3

INVENTOR
HERMANN J. STEINBACH

BY Walter V. Wright
AGENT

United States Patent Office 3,098,556
Patented July 23, 1963

3,098,556
CONVEYOR
Hermann J. Steinbach, Lancaster, Pa.
Filed May 13, 1960, Ser. No. 28,907
Claims priority, application Germany May 16, 1959
11 Claims. (Cl. 198—189)

This invention relates to belt conveyors. Specifically, it relates to belt conveyors wherein material transporting belts are carried on top of an endless intermediate drive member.

Conveyors are known wherein a conveying belt is attached to an intermediate drive member, such as an endless chain, by means of intermediate carrying plates. This relieves the belt from carrying both the driving stress and the weight of the material being conveyed. The weight of the material on the belt holds it in engagement with the drive member.

These conveyors are sufficiently rigid that travel is limited to straight line movement only. If a turn is to be negotiated, the conveyor must unload onto a second conveyor extending in the desired angular direction.

Proper lateral alignment of these conveyors is of paramount importance. Any lateral shifting places additional stress on one side of the belt at that point. Stresses of this type are not dissipated over a large portion of the belt; but are concentrated in the relatively small portion of the belt lying between the two adjacent supports. The factors creating this stress are much the same as would be encountered if the conveyor belt was laid along a curved path. In fact, a lateral misalignment really amounts to a small curve in the path of travel of the belt.

In negotiating a curve, large or small, the side of the belt on the outside of the curve must, in effect, stretch over a greater arc than the side of the belt on the inside of the curve. As the belt may be traveling at speeds approaching sixteen feet per second, the stretch and return of the belt is in the nature of an impact load on the belt. In time, this may play a material part in shortening the life of the belt.

In mining operations, and in other fields as well, conveyors of the above type commonly extend several miles across country. The maintenance of strict lateral alignment of such conveyors represents a tremendous, if not practically impossible, task.

It is, therefore, an object of this invention to provide an intermediate drive conveyor having greater flexibility than known conveyors of a similar type, whereby the belt may readily travel around curves.

It is a further object of this invention to provide an intermediate drive conveyor wherein stresses may be easily dissipated over a support member, thus, avoiding the concentration of stresses in the relatively short portion of the belt between two consecutive support members.

It is a further object of this invention to provide an intermediate drive conveyor wherein lateral alignment is no longer of critical importance; therefore, maintenance and repairs are greatly reduced.

Other objects and advantages will hereinafter become apparent.

The present invention features a plurality of belt supporting carriages interconnected by an intermediate drive member, such as an endless link chain. Each of the carriages carries guide rollers which ride along a track, or frame, and belt support rollers over which the conveyor belt is carried. The weight of the material on the belt causes it to sag between consecutive support rollers. Therefore, when the carriages and support rollers are driven along the track by the endless chain, the belt and material thereon are carried along.

A preferred design of the invention features brake shoes operable on the support rollers to control their resistance to rotation. Brake shoes can be mounted on a control plate which is movable relative to the carriage. The control plate is pressed against the belt by a spring, thus creating a friction force which in turn presses the brake shoes against the support rollers. Obviously, the braking force can be adjusted by varying the tension of the springs.

When it is desirable to have the support roller brakes function on the return run of the conveyor belt only, the spring may be omitted. The shape of the control plate mounting slot will enable the brake shoe control member to remain completely free of the conveyor belt on the feed stroke; while the force of gravity acting on the control plate will effectively apply the brake during the return run of the belt.

It may frequently be desirable to employ a belt of trough-shaped cross section. This may be accomplished by providing two parallel endless drive members and supporting one edge of the belt on each, allowing the belt to sag therebetween in the form of a trough.

The above embodiments of this invention will be better understood with reference to the drawings, in which.

The belt conveyor shown in FIGS. 1–4 consists, generally, of an intermediate drive member 1, a material conveying belt 2, and belt supporting assemblies, or carriages, 8. The belt 2 is supported at spaced intervals on support rollers 3, which are a part of the belt support carriages 8.

Figure 3:
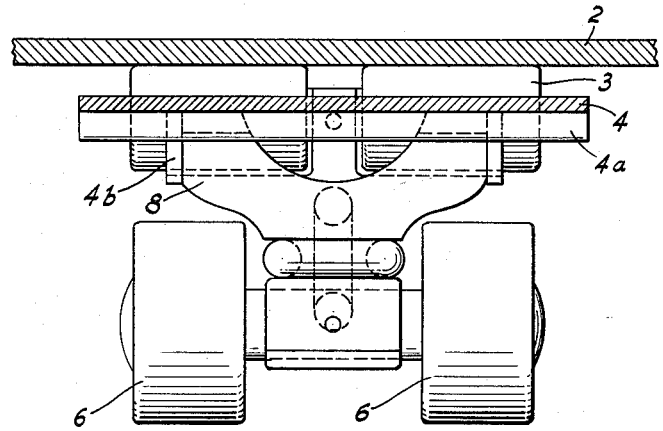
FIG. 3 is a cross sectional view taken on the line 3—3 of FIG. 1.
Figure 6:
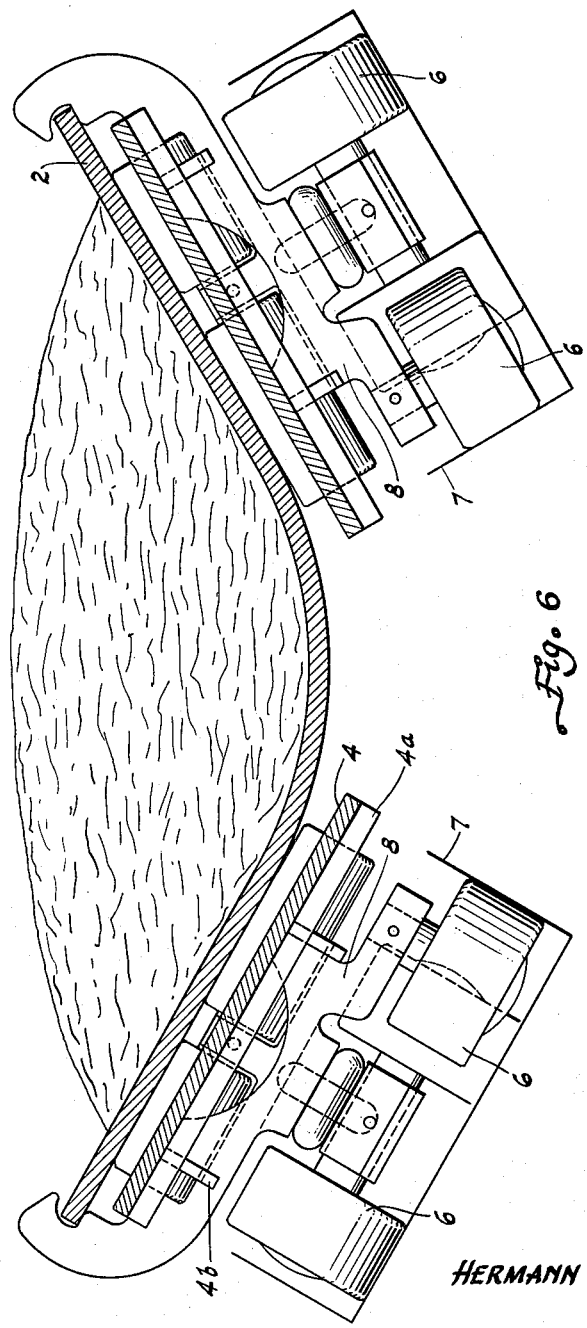
FIG. 6 is a transverse sectional view of a conveyor constructed according to this invention, wherein two drive members are employed to form a trough-shaped belt.

The intermediate drive member 1 consists of a link chain to which belt supporting carriages 8 are connected. These carriages carry the support rollers 3, which support the belt 2, as well as the guide rollers 6, which guide the whole drive assembly in the frame or track 7 (two such tracks are shown in FIG. 6). As seen in FIG. 3, each carriage 8 carries two coaxially mounted rollers 3. Belt support rollers 3 are mounted for independent, free rotation relative to carriage 8, as are guide rollers 6. The carriages 8 are connected at intervals to drive chain 1; the exact spacing depending upon the material to be conveyed, the intended speed of operation of the belt, the path of travel and other conditions which will vary from installation to insulation. The belt 2 merely rests on rollers 3 and is installed with a certain amount of slack between supports whereby the belt will intentionally sag between support rollers when it is loaded. The weight of material, thus, is employed to drivingly couple the belt to the carriages 8.

Under perfect operating conditions, when the conveyor is running in a straight line, the rollers 3 are rotating. However, when a curve is negotiated, when an irregularity is encountered in the track 7, or when any unexpected load is applied to the belt 2; the rollers 3 will rotate in response thereto. Thus, the stress will be dissipated over a greater length of belt than the relatively short portion lying between two consecutive supports.

The rollers 3 also enable the conveyor to negotiate turns. In a turn the outside edge of the belt merely draws its additional necessary length over the outside rollers 3 of the nearby supports. When the path straightens out again the rollers will rotate in the opposite direction until the "pull" on each side is equal. It will also be seen from the above that strict alignment of the belt is no longer of major importance, since the detrimental effects thereof are compensated for automatically by the rollers 3.

Figure 1:
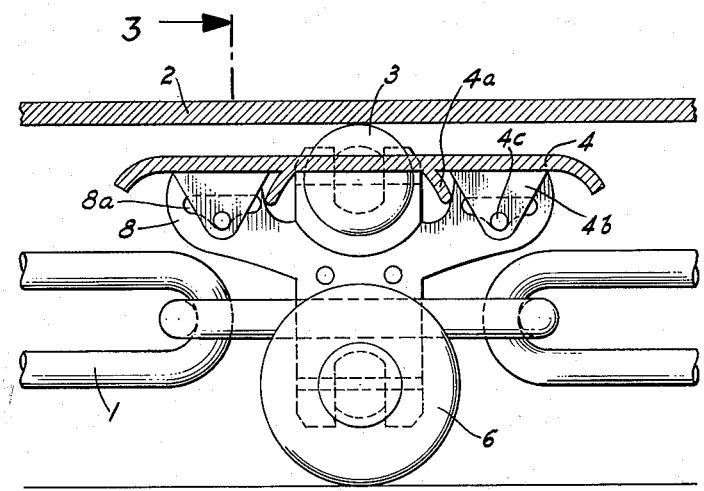
FIG. 1 is a fragmentary side elevational view showing a portion of the feed run of an endless belt conveyor constructed in accordance with this invention.
Figure 2:
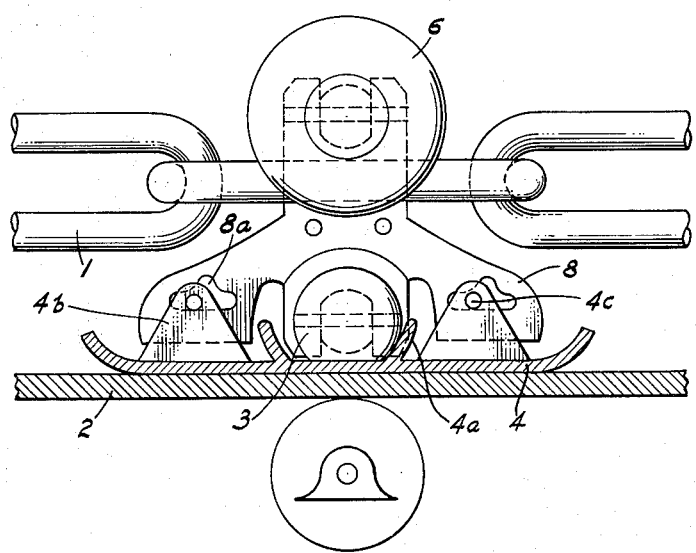
FIG. 2 is a fragmentary side elevational view of the return run of the conveyor of FIG. 1.
Figure 4:
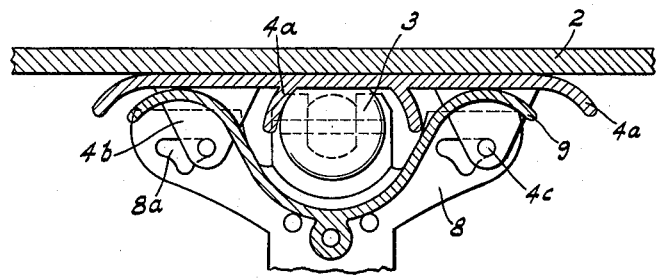
FIG. 4 is a fragmentary view similar to FIG. 1, showing another embodiment of the invention.
Figure 5:
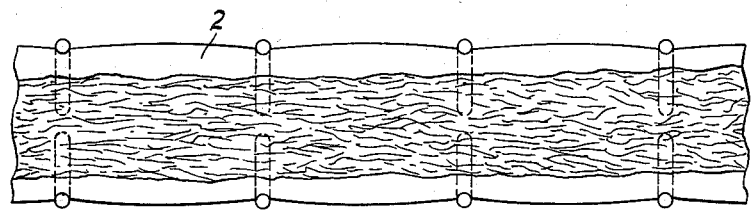
FIG. 5 is a diagrammatic plan view of a portion of the conveyor of FIG. 1.

Under certain conditions it becomes desirable, if not essential, to apply, to rollers 3, a controlled resistance to rotation. This may be accomplished (as seen in FIG. 4) by providing brake shoes 4a on a brake control plate, or member 4. The control member 4 carries mounting pins 4c receivable in generally T-shaped slots 8a in carriage 8. This enables control member 4 and brake shoes 4a to move, relative to carriage 8, toward and away from belt 2 as well as a short distance along the extent thereof. A spring 9 maintains control member 4 in contact with the underside of the belt 2. Any movement of belt 2 relative to carrier 8 will move the member 4 and thus present brake shoes 4a against the rollers 3. Thus the rollers will oppose movement in response to forces less than a predetermined amount, depending upon the spring 9.

Where it is desired to oppose rotation of rollers 3 only on the relatively light return run of the conveyor, the spring 9 may be omitted as seen in FIGS. 1 and 2. The force of gravity will substitute therefor to apply the brake on the return run while maintaining the brake disengaged on the feed run of the conveyor. Fixed support rollers, as seen at the bottom of FIG. 2, may be provided for the return run of the belt.

Another adaptation of the invention is seen in FIG. 6. Here, two parallel inclined tracks 7 are provided, as well as two drive members and two series of support carriages 8. The width of belt 2 bridges the space between the carriages to form a trough like belt in cross section. An additional guide roller 6 is provided to run along the side of track 7 and maintain the lateral spacing of the carriages. The function of each of the above discussed elements remains unchanged.

In addition to the savings in precise alignment maintenance over conventional intermediate drive belt conveyors, this invention enables faster belt speeds to be employed; thus, increasing the capacity of a conveyor of a given size. Moreover, further savings are realized in the elimination of the use of two or more independent conveyors and drive mechanisms to negotiate turns. Further savings appear in the reduction of belt wear which, consequently, prolongs the useful life of the belt.

While this invention has been described in connection with several embodiments thereof, it will be understood that it is capable of further modification. This application is intended to cover any variations, uses or adaptations of the invention following, in general, the principles of the invention and including such departures from the present disclosure as come within known or customary practice in the art to which it pertains, and as fall within the scope of the invention or the limits of the appended claims.

Having thus described my invention, what I claim is:

1. A conveyor comprising a movable endless drive chain, a plurality of longitudinally spaced carriages connected to said drive chain for movement therewith, each of said carriages having a support roller mounted thereon for rotation relative thereto and extending transverse to the extent of said chain, an endless material carrying belt resting relatively loosely on said rollers and extending parallel to said chain, said belt being connected to said carriages solely by the weight of the belt and the material carried thereon which causes said belt to sag between consecutive support rollers and deters rotation thereof whereby said belt and material are carried along with said carriages.

2. A conveyor comprising an endless material carrying belt having a feed run and a return run, support carriages at spaced intervals along said belt, said carriages each carrying support rollers thereon for free rotation relative thereto, said rollers extending transversely under said feed run and supporting the same, an endless drive member extending parallel to the feed run of said belt and connected to each support carriage for moving said carriages, said belt normally being held stationary relative to said support rollers by the weight of the material being carried by said belt whereby said belt is carried along by said carriages, said belt being movable over said roller in response to sufficient unbalancing of the belt tension on opposite sides of said rollers.

3. A conveyor comprising a material carrying endless belt having a feed run and a return run, support rollers at spaced intervals along said belt, said rollers extending transversely under said feed run and supporting the same, means supporting said rollers, and drive means moving said roller supporting means in the direction of extent of said feed run thereby moving said rollers and said belt, said rollers normally being held stationary relative to said roller supporting means by the weight of the material on said belt but being rotatable relative thereto in response to unbalancing of the belt tension on opposite sides thereof.

4. A conveyor comprising an endless belt upon which material is deposited to be conveyed, said belt having a feed run and a return run, support carriages at spaced intervals along said belt, said carriages each carrying a plurality of coaxial support rollers extending transversely under said feed run and supporting the same, an endless drive member connected to each support carriage for moving the same, the weight of material on the feed run of said belt causing said belt to sag between consecutive support carriages and be moved along therewith, the support rollers on any given carriage rotating only in response to an unbalancing of the belt tension on opposite sides of that carriage to equalize the tension of said belt on opposite sides of said given carriage.

5. A conveyor comprising a movable endless drive member, a plurality of belt support rollers connected to said drive member for movement therewith and a material transporting belt resting loosely on said support rollers, the weight of the material to be conveyed causing said belt to sag between consecutive support rollers and move along therewith, said support rollers normally being held stationary relative to said belt by the weight of the material being transported on the belt but being rotatable relative thereto in response to unbalancing of the belt tension on opposite sides of said rollers.

6. A conveyor comprising an elongate track, a plurality of carriages having guide wheels resting on said track, an endless drive chain having one run overlying said track and connected to each of said carriages for moving them along said track, a rotatable support roller on each of said carriages, an endless material carrying belt having a feed run overlying said track and resting on said support rollers, and means on each of said carriages for resisting rotation of its support roller whereby said belt will be carried along said track with said carriages upon movement of said endless chain.

7. A conveyor as recited in claim 6 wherein said means for resisting rotation of said support roller comprises a control member mounted on said carriage for movement relative thereto, a brake shoe carried by said control member and movable therewith, said control member being movable in one direction into engagement with said belt and movable in a second direction in response to engagement with said belt to present said brake shoe against said support roller.

8. A conveyor as recited in claim 6 wherein said means for resisting rotation of said support roller comprises a control member mounted on said carriage for movement relative thereto, a brake shoe carried by said control member and movable therewith, and means maintaining said control member in contact with said belt, said control member moving relative to said carriage to present said brake shoe against said support roller in response to relative movement between said belt and said carriage.

9. A conveyor as recited in claim 8 wherein said last named means is a spring.

10. A conveyor comprising a movable endless drive member, a plurality of spaced carriages connected to said drive member for movement along therewith, a plurality of relatively movable coaxially mounted support rollers on each of said carriages, a material carrying endless belt having its feed run supported on said rollers and means on said carriages for resisting rotation of said rollers whereby when said carriages and rollers are moved by said drive member said belt is carried along therewith.

11. A conveyor comprising an elongate track, a plurality of carriages on said track, an endless drive member connected to each of said carriages for moving them along said track, a rotatable support roller on each of said carriages, a material carrying endless belt having a feed run supported on said rollers and means on said carriages for resisting rotation of said rollers whereby said belt will be carried along with said carriages when said drive member moves said carriages along said track.

References Cited in the file of this patent

UNITED STATES PATENTS

| | | |
|---|---|---|
| 2,650,695 | Robins | Sept. 1, 1953 |
| 2,895,593 | McKnight et al. | July 21, 1959 |